United States Patent [19]

Schäfer et al.

[11] 4,172,936
[45] Oct. 30, 1979

[54] POLYHYDROXYL COMPOUNDS CONTAINING ACYL UREA GROUPS USEFUL IN PREPARATION OF POLYURETHANE FOAMS

[75] Inventors: Walter Schäfer, Cologne; Kuno Wagner, Leverkusen; Kurt Findeisen, Odenthal, all of Fed. Rep. of Germany

[73] Assignee: Bayer Aktiengesellschaft, Leverkusen, Fed. Rep. of Germany

[21] Appl. No.: 889,464

[22] Filed: Mar. 23, 1978

[30] Foreign Application Priority Data

Mar. 31, 1977 [DE] Fed. Rep. of Germany ....... 2714293

[51] Int. Cl.² .............................................. C08G 18/06
[52] U.S. Cl. .................................. 528/49; 260/456 A; 260/464; 260/465 D; 260/465.4; 528/76; 528/84; 560/26; 560/115; 560/158; 521/159
[58] Field of Search .............. 528/49, 76, 84; 560/26, 560/158, 115; 260/464, 465 D, 465.4, 456 A

[56] References Cited

U.S. PATENT DOCUMENTS 4,077,989  3/1978  Schäfer et al. .......................560/26

Primary Examiner—Maurice J. Welsh
Attorney, Agent, or Firm—Gene Harsh; Joseph C. Gil; R. Brent Olson

[57] ABSTRACT

This invention relates to new polyols modified by acyl urea groups, to a process for the preparation thereof and to the use thereof as starting component for the preparation of preferably foamed polyurethane plastics. The process involves (A) reacting diisocyanatocarbodiimides corresponding to the following general formula:

OCN—(R²—N=C=N—)ₘR²—NCO at a temperature of from about 25° to 130° C., optionally in the presence of an inert solvent, with polyhydroxyl compounds corresponding to the following general formula:

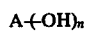

in an OH/NCO-ratio of from 1.2:1 to 30:1 to form a polyhydroxyl compound containing carbodiimide groups and (B) completely or partially reacting, the carbodiimide groups remaining in the product of step (A) at a temperature of from 25° to 100° C., optionally in the presence of an inert solvent, with a carboxylic acid corresponding to the following general formula:

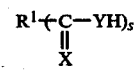

to form acyl urea groups, and (C) distilling off the inert solvent, if used; wherein
  m represents a number of from 1 to 10;
  s represents an integer of from 1 to 3; and
  R¹ represents hydrogen or a monofunctional or — in the form of a bridge to further acyl groups — a di- or trifunctional $C_1$–$C_{18}$ aliphatic, $C_4$–$C_{15}$ cycloaliphatic, $C_6$–$C_{15}$ araliphatic or aromatic radical which may contain one or two double bonds and-/or be branched and which may optionally contain one or two substituents selected from the group consisting of hydroxyl, mercapto, secondary amino, sulphonic acid ester, phosphonic acid ester, carboxylic ester, siloxane or trifluoromethyl groups, fluorine, chlorine, bromine or iodine;
  R² represents a difunctional aliphatic, cycloaliphatic, aromatic or araliphatic radical containing from 4 to 25 carbon atoms obtained by removing the isocyanate groups from a diisocyanate;
  A represents an n-functional radical obtained by removing the hydroxyl groups from a polyhydroxyl compound having a molecular weight of from 62 to 6000;
  X and Y, which may be the same or different, each represents oxygen or sulphur;
  n represents an integer of from 2 to 8.

10 Claims, No Drawings

POLYHYDROXYL COMPOUNDS CONTAINING ACYL UREA GROUPS USEFUL IN PREPARATION OF POLYURETHANE FOAMS

BACKGROUND OF THE INVENTION

The idea of producing acyl urea modified polyisocyanates from carbodiimide modified polyisocyanates is known e.g. U.S. Pat. Nos. 3,517,039; 3,383,400; and 3,914,269. However, the idea of producing acyl urea modified polyols is heretofore unknown.

DESCRIPTION OF THE INVENTION

More particularly, the present invention relates to compounds containing at least two, preferably from 2 to 8 and, with particular preference, from 2 to 4, terminal hydroxyl groups, having a molecular weight of from 400 to 20,000, preferably from 600 to 15,000 and, with particular preference, from 2000 to 10,000 and comprising segments corresponding to the following general formulae:

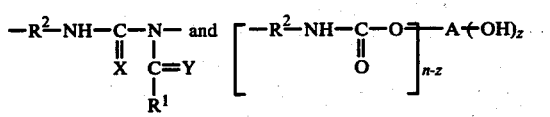

wherein
X and Y, which may be the same or different, each represents oxygen or sulphur, preferably oxygen;
$R^1$ represents hydrogen or a monofunctional or, in the form of a bridge to other acyl urea groups, di- or trifunctional (preferably difunctional) $C_1$–$C_{18}$, preferably $C_1$–$C_6$, aliphatic; $C_4$–$C_{15}$, preferably $C_6$–$C_{10}$, cycloaliphatic; $C_6$–$C_{15}$, preferably $C_6$–$C_{10}$, araliphatic or aromatic radical which may optionally contain one or two double bonds and/or be branched and which may optionally contain one or two of the following substituents: hydroxyl, mercapto, secondary amino, sulphonic acid ester, phosphoric acid ester, carboxylic, carboxylic ester, siloxane or trifluoromethyl groups, fluorine, chlorine, bromine or iodine;
$R^2$ represents a difunctional aliphatic, cycloaliphatic, aromatic or aralipthatic radical having from 4 to 25, preferably from 6 to 15, carbon atoms of the type obtained by removing the isocyanate groups from a diisocyanate;
A represents an n-functional radical of the type obtained by removing the hydroxyl groups from a polyhydroxyl compound having a molecular weight of from 62 to 6000;
n represents an integer of from 2 to 8, preferably from 2 to 4 and, with particular preference, 2 or 3; and
z represents an integer having a value of from 0 to (n−1).

The present invention also relates to a process for the preparation of the polyhydroxyl compounds containing acyl urea groups, wherein, in a first step, diisocyanatocarbodiimides corresponding to the following general formula:

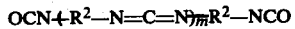

are reacted at a temperature of from about 25° to 130° C., preferably from 90° to 120° C., optionally in the presence of an inert solvent, with polyhydroxyl compounds corresponding to the following general formula:

$$A{-}(OH)_n$$

in an OH/NCO-ratio of from 1.2:1 to 30:1, preferably from 1.5:1 to 15:1 and, with particular preference, about 2:1, to form a polyhydroxyl compound containing carbodiimide groups. In a second step, the carbodiimide groups are completely or only partly reacted at a temperature of from 25 to 100° C., preferably from 60° to 90° C., optionally in the presence of an inert solvent, with a carboxylic acid corresponding to the following general formula:

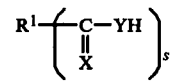

to form acyl urea groups. After the reaction, the solvent if used, is distilled off. In the above process,
m represents a number of from 1 to 10, preferably 1 or 2; and
s represents an integer of from 1 to 3, preferably 1 or 2; and
$R^1$, $R^2$, A, X, Y and n are as defined above.
The preparation of diisocyanatocarbodiimides corresponding to the following general formula:

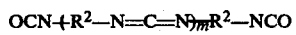

is known and is described, for example, in U.S. Pat. Nos. 2,840,589 and 2,941,966 and by P. W. Campbell and K. C. Smeltz in "Journal of Organic Chemistry", 28, 2069 (1963). Diisocyanatocarbodiimides may also be obtained in a particularly mild manner and free from secondary products by heterogeneous catalysis in accordance with German Offenlegungsschriften Nos. 2,504,400 and 2,552,350. The conversion of diisocyanates into carbodiimides in the presence of very small quantities of phospholine oxide, followed by blocking of the catalyst with acid chlorides, is described in DOS No. 2,653,120.

Starting components suitable for producing the diisocyanatocarbodiimides are aliphatic, cycloaliphatic, araliphatic, aromatic and heterocyclic polyisocyanates of the type described, for example, by W. Siefken in Justus Liebigs Annalen der Chemie, 562, pages 75 to 136. These include, for example, ethylene diisocyanate; 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl cyclohexane (DAS No. 1,202,785; U.S. Pat. No. 3,401,190), 2,4- and 2,6-hexahydrotolylene diisocyanate and mixtures of these isomers; hexahydro-1,3- and/or -1,4-phenylene diisocyanate; perhydro-2,4'- and/or -4,4'-diphenyl methane diisocyanate; 1,3- and 1,4-phenylene diisocyanate; 2,4- and 2,6-tolylene diisocyanate and mixtures of these isomers; diphenyl methane-2,4'- and/or -4,4'-diisocyanate; naphthylene-1,5-diisocyanate; m- and p-isocyanatophenyl sulphonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Pat. No. 1,092,007 (U.S. Pat. No. 3,152,162); diisocyanates of the type described in U.S. Pat. No. 3,492,330; polyisocyanates containing allophanate groups of the type described, for example, in British Pat. No. 994,890, in Belgian Pat. No. 761,626 and in Published Dutch Pat. application No. 7,102,524; polyisocyanates containing isocyanurate groups of the type described, for example, in U.S. Pat. No. 3,001,973, in German Pat. Nos. 1,022,789; 1,222,067 and 1,027,394 and in German Offenlegungsschriften Nos. 1,929,034 and 2,004,048; polyisocyanates containing urethane groups of the type described, for example, in Belgian Pat. No. 752,261 or in U.S. Pat. No. 3,394,164; polyisocyanates containing acylated urea groups according to German Pat. No. 1,230,778; polyisocyanates containing biuret groups of the type described, for example, in German Pat. No. 1,101,394 (U.S. Pat. Nos. 3,124,605 and 3,201,372) and in British Pat. No. 889,050; polyisocyanates produced by telomerization reactions of the type described, for example, in U.S. Pat. No. 3,654,106; polyisocyanates containing ester groups of the type described, for example, in British Pat. Nos. 965,474 and 1,072,956, in U.S. Pat. No. 3,567,763 and in German Pat. No. 1,231,688; reaction products of the above-mentioned isocyanates with acetals according to German Pat. No. 1,072,385 and polyisocyanates containing polymeric fatty acid residues according to U.S. Pat. No. 3,455,883.

It is particularly preferred to use diisocyanates of the type in which one isocyanate group has a greater tendency towards carbodiimide formation than the other. Examples of such diisocyanates include: 2,4-tolylene diisocyanate; 1-methoxy-2,4-phenylene diisocyanate; 1-chlorophenyl-2,4-diisocyanate; p-(1-isocyanatoethyl)-phenyl isocyanate; m-(3-isocyanatobutyl)-phenyl isocyanate and 4-(2-isocyanatocyclohexyl-methyl)-phenyl isocyanate.

According to the present invention, polyhydroxyl compounds corresponding to the following general formula:

A$-$(OH)$_n$ include, on the one hand, polyhydric alcohols having a molecular weight of from 62 to approximately 250 and, on the other hand, polyester and polyether polyols having a molecular weight of from 150 to 6000, preferably from 500 to 5000 and, with particular preference, from 1000 to 4000, of the type known for the preparation of homogeneous and cellular polyurethane plastics.

Examples of such compounds include: ethylene glycol; 1,2- and 1,3-propylene glycol; 1,4- and 2,3-butylene glycol; 1,5-pentane diol; 1,6-hexane diol; 1,8-octane diol; neopentyl glycol; 1,4-bis-hydroxymethyl cyclohexane; 2-methyl-1,3-propane diol; glycerol; trimethylol propane; 1,2,6-hexane triol; trimethylol ethane; pentaerythritol; quinitol; mannitol; sorbitol; diethylene glycol; triethylene glycol; tetraethylene glycol; polyethylene glycols having a molecular weight of up to 400; dipropylene glycol; polypropylene glycols having a molecular weight of up to 400; dibutylene glycol; polybutylene glycols having a molecular weight of up to 400; methyl glycoside; diethanolamino-N-methyl phosphonic acid ester; castor oil; diethanolamine; N-methyl ethanolamine; and triethanolamine.

Suitable polyesters containing hydroxyl groups include, for example, reaction products of polyhydric, preferably dihydric acid, optionally, even trihydric alcohols with polybasic, preferably dibasic, carboxylic acids. Instead of using the free polycarboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic and/or heterocyclic and may optionally be substituted, for example, by halogen atoms, and/or may be unsaturated.

Examples of such polycarboxylic acids include: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumeric acid, dimeric and trimeric fatty acids, such as oleic acid, optionally in admixture with monomeric fatty acids, terephthalic acid dimethyl ester and terephthalic acid-bisglycol ester. Suitable polyhydric alcohols include, for example, ethylene glycol; 1,2- and 1,3-propylene glycol; 1,4- and 2,3-butylene glycol; 1,6-hexane diol; 1,8-octane diol; neopentyl glycol; cyclohexane dimethanol (1,4-bis-hydroxymethylcyclohexane); 2-methyl-1,3-propane diol; glycerol; trimethylol propane; 1,2,6-hexane triol; 1,2,4-butane triol; trimethylol ethane; pentaerythritol, quinitol; mannitol; sorbitol; methyl glycoside, diethylene glycol; triethylene glycol; tetraethylene glycol; polyethylene glycols; dipropylene glycol; polypropylene glycols; dibutylene glycol and polybutylene glycols. (The polyesters may also contain terminal carboxyl groups. Polyesters of lactones, for example, ε-caprolactone, or hydroxy carboxylic acids, for example ω-hydroxycaproic acid, may also be used.)

The polyethers containing at least two, generally from two to eight, preferably 2 or 3, hydroxyl groups which may be used in accordance with the present invention are also known and are obtained, for example, by polymerizing epoxides, such as ethylene oxide, propylene oxide, butylene oxide, tetrahydrofuran, styrene oxide or epichlorhydrin, on their own, for example in the presence of BF$_3$, or by adding these epoxides, optionally in admixture or successively, with starter components containing reactive hydrogen atoms. Such starter compounds include water, ammonia, alcohols or amines, for example ethylene glycol, 1,3- or 1,2-propylene glycol, trimethylol propane, 4,4'-dihydroxydiphenyl propane, aniline, ethanolamine or ethylene diamine. Sucrose polyethers of the type described for example, in German Auslegeschriften No. 1,176,358 and 1,064,938 may also be used in accordance with the present invention. In many cases, it is preferred to use polyethers of the type which predominantly contain primary OH-groups (up to 90%, by weight, based on all the OH-groups present in the polyether). Polyethers modified by vinyl polymers of the type obtained, for example, by polymerizing styrene and acrylonitrile in the presence of polyethers (U.S. Pat. Nos. 3,383,351; 3,304,273; 3,523,093 and 3,110,695; German Pat. No. 1,152,536) are also suitable, as are polybutadienes containing OH-groups.

Among the polythioethers, particular reference is made to the condensation products of thiodiglycol on its own and/or with other glycols, dicarboxylic acids, formaldehyde, aminocarboxylic acids or amino alcohols. Depending upon the co-components, the products are polythio mixed ethers, polythioether esters or polythioether ester amides.

Suitable polyacetals are, for example, the compounds obtainable from the reaction of glycols, such as diethylene glycol, triethylene glycol, 4,4'-dioxethoxy diphenyl dimethyl methane and hexane diol, with formaldehyde. Polyacetals suitable for use in accordance with the present invention may also be obtained by the polymerization of cyclic acetals.

Polycarbonates containing hydroxyl groups suitable for use in accordance with the present invention are those known compounds which may be prepared, for example, by reacting diols, such as 1,3-propane diol, 1,4-butane diol and/or 1,6-hexane diol, diethylene glycol, triethylene glycol or tetraethylene glycol, with diaryl carbonates, for example diphenyl carbonate, or with phosgene.

The polyester amides and polyamides include, for example, the predominantly linear condensates obtained from polybasic saturated and unsaturated carboxylic acids or the anhydrides thereof and polyfunctional saturated and unsaturated amino alcohols, diamines, polyamines and mixtures thereof.

Polyhydroxyl compounds already containing urethane or urea groups and optionally modified natural polyols, such as castor oil, carbohydrates or starch, may also be used. Addition products of alkylene oxides with phenol-formaldehyde resins or even with urea-formaldehyde resins may also be used in accordance with the present invention.

Representatives of these compounds which may be used in accordance with the present invention are described, for example, in High Polymers, Vol. XVI, "Polyurethanes, Chemistry and Technology", by Saunders-Frisch, Interscience Publishers, New York, London, Vol. I, 1962, pages 32 to 42 and pages 44 to 54 and Vol. II, 1964, pages 5–6 and 198–199, and in Kunststoff-Handbuch, Vol. VII, Vieweg-Hochtlen, Carl-Hanser Verlag, Munich, 1966, for example on pages 45 to 71.

According to the present invention, however, it is also possible to use polyhydroxyl compounds which contain high molecular weight polyadducts or polycondensates in finely disperse or dissolved form. Such modified polyhydroxyl compounds are obtained by carrying out polyaddition reactions (for example reactions between polyisocyanates and amino-functional compounds) or polycondensation reactions (for example between formaldehyde and phenols and/or amines) in situ in the above-mentioned compounds containing hydroxyl groups. Such processes are described, for example, in German Auslegeschriften Nos. 1,168,075 and 1,260,142 and in German Offenlegungsschriften Nos. 2,324,134; 2,423,984; 2,512,385; 2,513,815; 2,550,796; 2,550,797; 2,550,833 and 2,550,862. However, it is also possible, in accordance with U.S. Pat. No. 3,869,413 or German Offenlegungsschrift No. 2,550,860, to mix a prepared aqueous polymer dispersion with a polyhydroxyl compound and then to remove the water from the mixture.

According to the present invention, preferred polyols are polypropylene glycols, trimethylol propane- or glycerol-started copolymers of propylene oxide and ethylene oxide and also polyesters based on adipic acid, 1,4-butane diol, diethylene glycol, 1,6-hexane diol and/or neopentyl glycol.

In the first step of the process according to the present invention, the diisocyanatocarbodiimides corresponding to the following general formula:

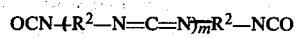

are reacted with the polyhydroxyl compounds corresponding to the following general formula:

in an OH/NCO-ratio of from 1.2:1 to 30:1, preferably from 1.5:1 to 15:1 and, with particular preference, about 2:1, at temperatures of from 25° to 130° C., preferably from 90° to 120° C. The progress of the reaction may readily be followed by IR-spectroscopy from the disappearance of the isocyanate band at 2220 cm$^{-1}$.

After all the isocyanate groups have reacted, a mono-, di- or tricarboxylic acid corresponding to the following general formula:

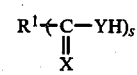

is added at a temperature of from 25° to 100° C., preferably from 60° to 90° C. A quantity of carboxylic acid groups substantially equivalent to the carbodiimide groups is preferably used. However, it is also possible, in order to retain some of the carbodiimide groups, to add a less than equivalent amount of carboxylic acid (from about 25 to 95% of the equivalent quantity). The free carbodiimide groups which are still present in that case may optionally be reacted with other reactants, for example with amines or water. In the case of polycarboxylic acids, it is also possible to use more than equivalent quantities. In that case, modified polyols containing free carboxy groups are formed.

In the above general formula, $R^1$ preferably represents a $C_1$–$C_{17}$ aliphatic hydrocarbon radical which may optionally contain double bonds and/or branches and which may be substituted by chlorine, hydroxyl groups or secondary alkylamino groups.

Examples of suitable carboxylic acids include: formic acid, acetic acid, thioacetic acid, propionic acid, pivalic acid lactic acid, lauric acid, stearic acid, acrylic acid, methacrylic acid, oleic acid, undecylenic acid, sorbic acid, linoleic acid, crotonic acid, cyclohexane carboxylic acid, 1-cyclohexane carboxylic acid, caproic acid, chloroacetic acid, phenoxy acetic acid, 2-chlorophenoxy acetic acid, N,N-dimethyl-6-aminocaproic acid, linolenic acid, adipic, sebacic acid, dimethylol propionic acid, citric acid and salicylic acid.

The process according to the present invention may optionally be carried out in the presence of inert solvents, for example benzene, toluene, xylene, chlorobenzene, dichlorobenzene and mixtures thereof with sterically hindered alcohols, such as tert.-butanol; methylene chloride, chloroform, dimethyl formamide or dioxane. In order to isolate the pure product, the solvent used, if any, may be subsequently removed.

It is known from the literature that carbodiimides react with alcohols to form isourea compounds. Accordingly, it may be regarded as surprising that virtually no addition of hydroxyl groups with the carbodiimide groups to form cross-linked, insoluble products occurs in the first step of the process according to the present invention. Instead, an intermediate product which is relatively stable in storage is formed. It may also be regarded as surprising that, in the second step of the process according to the present invention, there is no ester formation between the carboxylic acid and the free hydroxyl groups because it also is known from the literature that carbodiimides greatly accelerate the esterification reaction. The fact that virtually no esterification occurs in the process according to the present invention is proved by the absence of the urea band at 1675 cm$^{-1}$ in the IR-spectrum of the end product. After an esterification reaction, such a band should appear automatically through the addition of water with the carbodiimide group.

The modified polyhydroxyl compounds according to the present invention are valuable starting components for the preparation of polyurethane plastics, preferably foams. Polyurethane foams prepared from them show greatly improved fire resistance and excellent mechanical properties.

Accordingly, the present invention also relates to a process for the preparation of optionally cellular polyurethane plastics comprising reacting:
(a) polyisocyanates, with
(b) polyhydroxyl compounds; and, optionally,
(c) other compounds containing isocyanate-reactive groups; optionally in the presence of
(d) blowing agents, catalysts and other known additives;
wherein the polyols according to the present invention which are modified by acyl urea groups are used as component (b).

Suitable isocyanates include any of the above-mentioned diisocyanates and also the distillation residues containing isocyanate groups obtained in the commercial production of isocyanates, optionally in solution in one or more monomeric polyisocyanates, as well as polyphenyl-polymethylene polyisocyanates of the type obtained by condensing aniline with formaldehyde, followed by phosgenation. In addition to the polyhydroxyl compounds of the present invention, it is also possible to use the above-mentioned unmodified polyols and the conventional diamine chain-extending agents.

Aliphatic diamines suitable for use in accordance with the present invention include, for example, ethylene diamine; 1,4-tetramethylene diamine; 1,11-undecamethylene diamine; 1,12-dodecamethylene diamine and mixtures thereof; 1-amino-3,3,5-trimethyl-5-aminomethyl cyclohexane; 2,4- and 2,6-hexahydrotolylene diamine and mixtures thereof; perhydro-2,4'- and -4,4'-diamino-diphenyl methane; p-xylylene diamine; bis-(3-aminopropyl)-methylamine, etc. According to the present invention, it is also possible to use hydrazine and substituted hydrazines, for example methyl hydrazine, N,N'-dimethyl hydrazine and homologues thereof. Also suitable are acid dihydrazides such as carbodihydrazide, oxalic acid dihydrazide, the dihydrazides of malonic acid, succinic acid, glutaric acid, adipic acid, β-methyl adipic acid, sebacic acid, hydracrylic acid and terephthalic acid, semicarbazido-alkylene-hydrazides, such as β-semicarbazidopropionic acid hydrazide (DOS No. 1,770,591), semicarbazidoalkylene carbazinic esters, such as 2-semicarbazidoethyl carbazinic ester (DOS No. 1,918,504) or even aminosemicarbazide compounds, such as β-aminoethyl semicarbazidocarbonate (DOS No. 1,902,931).

Examples of aromatic diamines are bis-anthranilic acid esters according to German Offenlegungsschriften Nos. 2,040,644 and 2,160,590; 3,5- and 2,4-diaminobenzoic acid esters according to DOS No. 2,025,900; the diamines containing ester groups described in German Offenlegungsschriften Nos. 1,803,635; 2,040,650 and 2,160,589; 3,3'-dichloro-4,4'-diaminodiphenyl methane; tolylene diamine; 4,4'-diaminodiphenyl methane; and 4,4'-diaminodiphenyl disulphide.

According to the present invention, other suitable chain-extenders include compounds such as 1-mercapto-3-aminopropane; optionally substituted amino acids such as glycine, alanine, valine, serine and lycine; and optionally substituted dicarboxylic acids such as succinic acid, adipic acid, phthalic acid, 4-hydroxyphthalic acid and 4-aminophthalic acid.

It is also possible to use compounds which are monofunctional with respect to isocyanates in proportions of from 0.01 to 10%, by weight, based on the polyurethane solids, as so-called "chain-terminators". Such monofunctional compounds are, for example, monoamines, such as butyl- and dibutyl-amine, octylamine, stearylamine, N-methylstearylamine, pyrrolidine, piperidine and cyclohexylamine, monohydric alcohols, such as butanol, 2-ethyl hexanol, octanol, dodecanol, the various amyl alcohols, cyclohexanol, ethylene glycol monoethyl ether, etc.

According to the present invention water and/or readily volatile organic substances may be used as blowing agents. Suitable organic blowing agents include acetone, ethyl acetate; halogen-substituted alkanes such as methylene chloride, chloroform, ethylidene chloride, vinylidene chloride, monofluorotrichloromethane, chlorodifluoromethane, dichlorodifluoromethane; and butane, hexane, heptane or diethyl ether. A blowing effect may also be obtained by adding compounds which decompose at temperatures above room temperature giving off gases, such as nitrogen, for example azo-compounds, such as azoisobutyronitrile. Other examples of blowing agents and information on the use of blowing agents may be found in Kunststoff-Handbach, Vol. VII, by Vieweg and Hochtlen, Carl-Hanser-Verlag, Munich 1966, for example on pages 108 and 109, 453 to 455 and 507 to 510.

According to the present invention, catalysts are also frequently used. Examples of suitable known catalysts include tertiary amines, such as triethylamine, tributylamine, N-methyl morpholine, N-ethyl morpholine, N-cocomorpholine, N,N,N',N'-tetramethyl ethylene diamine, 1,4-diazabicyclo-(2,2,2)-octane, N-methyl-N'-dimethylaminoethyl piperazine, N,N-dimethyl benzylamine, bis-(N,N-diethylaminoethyl)-adipate, N,N-diethyl benzylamine, pentamethyl diethylene triamine, N,N-dimethyl cyclohexylamine, N,N,N',N'-tetramethyl-1,3-butane diamine, N,N-dimethyl-β-phenylethylamine, 1,2-dimethylimidazole and 2-methylimidazole. Other suitable catalysts are known Mannich bases of secondary amines, such as dimethylamine, and aldehydes, preferably formaldehyde, or ketones, such as acetone, methylethyl ketone or cyclohexanone, and phenols, such as phenol, nonylphenol or bisphenol.

Examples of tertiary amine catalysts containing isocyanate-reactive hydrogen atoms include; triethanolamine, triisopropanol-amine, N-methyl diethanolamine, N-ethyl diethanolamine, N,N-dimethyl ethanolamine and the reaction products thereof with alkylene oxides, such as propylene oxide and/or ethylene oxide.

Other suitable catalysts are silaamines having carbon-silicon bonds of the type described, for example, in German Pat. No. 1,229,290 (corresponding to U.S. Pat. No. 3,620,984). These include compounds such as 2,2,4-trimethyl-2-silamorpholine and 1,3-diethyl aminomethyl tetramethyl disiloxane.

Other suitable catalysts are nitrogen-containing bases, such as tetraalkyl ammonium hydroxides; alkali metal hydroxides, such as sodium hydroxide; alkali metal phenolates, such as sodium phenolate; and alkali metal alcoholates, such as sodium methylate. Hexahydrotriazines may also be used as catalysts.

According to the present invention, organometallic compounds, especially organo-tin compounds, may also be used as catalysts.

Preferred organo-tin compounds are tin(II)salts of carboxylic acids, such as tin(II)acetate, tin(II)octoate, tin(II)ethyl hexoate and tin(II)laurate, and the tin(IV) compounds, such as dibutyl tin oxide, dibutyl tin dichloride, dibutyl tin diacetate, dibutyl tin dilaurate, dibutyl tin maleate or dioctyl tin diacetate. It is, of course, possible to use the above-mentioned catalysts in the form of mixtures.

Further representatives of catalysts suitable for use in accordance with the present invention and details on the way in which the catalysts work may be found in Kunststoff-Handbach, Vol. VII, by Vieweg and Hochtlen, Carl-Hanser-Verlag, Munich, 1966, for example on pages 96 to 102.

The catalysts are generally used in quantities of from about 0.001 to 10%, by weight, based on the quantity of compounds containing at least two isocyanate-reactive hydrogen atoms and having a molecular weight of from 400 to 10,000.

According to the present invention, surface-active additives, such as emulsifiers and foam stabilizers, may also be used. Examples of emulsifiers are the sodium salts of castor oil sulphonates or salts of fatty acids with amines, such as diethyl amine/oleic acid or diethanolamine/stearic acid. Alkali metal or ammonium salts of sulphonic acids, such as those of dodecyl benzene sulphonic acid or dinaphthyl methane disulphonic acid, or of fatty acids, such as ricinoleic acid, or of polymeric fatty acids, may also be used as surface-active additives.

Particularly suitable foam stabilizers are polyether siloxanes, especially water-soluble types. These compounds generally have a structure in which a copolymer of ethylene oxide and propylene oxide is attached to a polydimethyl siloxane radical. Foam stabilizers of this type are described, for example, in U.S. Pat. Nos. 2,834,748; 2,917,480 and 3,629,308.

According to the present invention, it is also possible to use reaction retarders, for example substances which are acid in reaction, such as hydrochloric acid or organic acid halides; known cell regulators, such as paraffins or fatty alcohols or dimethyl polysiloxanes; pigments or dyes; known flameproofing agents, for example trischlorethyl phosphate, tricresyl phosphate or ammonium phosphate and polyphosphate; stabilizers against the effects of ageing and weathering; plasticizers; substances having fungistatic and bacteriostatic effects; and fillers such as barium sulphate, kieselguhr, carbon black or prepared chalk.

Other examples of the surface-active additives and foam stabilizers optionally used in accordance with the present invention and of cell regulators, reaction retarders, stabilizers, flameproofing substances, plasticizers, dyes and fillers, substances having fungistatic and bacteriostatic effects and also details on the way in which these additives are to be used and how they work, may be found in Kunststoff-Handbuch, Vol. VII, published by Vieweg and Hochtlen, Carl-Hanser-Verlag, Munich, 1966, for example on pages 103 to 113.

According to the present invention, the reaction components may be reacted by the known one-shot process, by the prepolymer process or by the semi-prepolymer process, in many cases using machines of the type described, for example, in U.S. Pat. No. 2,764,565. Particulars of processing equipment suitable for use in accordance with the present invention may be found, for example, on pages 121 and 205 of Kunststoff-Handbuch, Vol. VII, published by Vieweg and Hochtlen, Carl-Hanser-Verlag, Munich 1966.

In the production of foams, the foaming reaction is preferably carried out in molds in accordance with the present invention. To this end, the reaction mixture is introduced into a mold. Suitable mold materials are metals, for example aluminum, or plastics, for example epoxide resins. Inside the mold, the foamable reaction mixture foams and forms the molding. In-mold foaming may be carried out in such a way that the molding has a cellular structure at its surface, or even in such a way that the molding has a compact skin and a cellular core. According to the present invention, it is possible in this connection to introduce such a quantity of foamable reaction mixture into the mold that the foam formed just fills the mold. However, it is also possible to introduce into the mold more foamable reaction mixture than is required for filling the mold with foam. This technique is known as "overcharging" and is known, for example, from U.S. Pat. Nos. 3,178,490 and 3,182,104.

Known "external release agents", such as silicone oils, are frequently used for in-mold foaming. However, it is also possible to use so-called "internal release agents", optionally in admixture with external release agents, such as are known, for example, from German Offenlegungschriften Nos. 2,121,670 and 2,307,589.

According to the present invention, cold-hardening foams may also be produced (cf. British Pat. No. 1,162,517, German Offenlegungsschrift No. 2,153,086).

However, it is, of course, also possible to produce foams by block foaming or by the known laminator process.

EXAMPLES

EXAMPLE 1

2400 g (0.5 mol) of a polyether of trimethylol propane, propylene oxide and ethylene oxide having an OH-number of 35 are dehydrated by heating to 120° C. in a vacuum of 12 Torr and then combined, at 120° C., with 76 g (0.25 mol) of bis-(3-isocyanato-4-methylphenyl)-carbodiimide dissolved in 300 ml of xylene.

After all the isocyanate groups have reacted, which takes about 2 hours, 18 g (0.3 mol) of acetic acid are added at 80° C. Following removal of the solvent (at from 90° to 100° C./0.15 Torr), the product which contains acyl urea groups has a viscosity $\eta_{24}$ of 7400 cP and an OH-number of 24 (molecular weight approximately 10,000).

EXAMPLE 2

172 g (0.1 mol) of a polyester of adipic acid, 1,6-hexane diol and neopentyl glycol having an OH-number of 66 are dried by heating to 120° C. in a vacuum of 12 Torr and subsequently combined with 15.2 g (0.05 mol) of bis-(3-isocyanato-4-methylphenyl)-carbodiimide. After the isocyanate groups have reacted at from 110° to 120° C., 3 g (0.05 mol) of acetic acid are added at from 80° to 90° C. The carbodiimide groups react to form acyl urea groups. The reaction product has a viscosity $\eta_{24}$ of 9280 cP and an OH-number of 30 (molecular weight approximately 4000).

EXAMPLE 3

2400 g (0.5 mol) of a polyether of trimethylol propane, propylene oxide and ethylene oxide having an OH-number of 35 are dehydrated over a period of 30 minutes at 120° C. in a vacuum of 12 Torr and is subsequently combined, at 120° C., with 76 g (0.25 mol) of bis-(3-isocyanato-4-methylphenyl)-carbodiimide.

After the isocyanate groups have reacted, 50 g (0.25 mol) of lauric acid are stirred in at from 80° to 90° C., the carbodiimide groups reacting to form the corresponding acyl urea groups. The product has a viscosity at 24° C. of 7200 cP and an OH-number of 24 (molecular weight approximately 10,000).

EXAMPLE 4

480 g (0.1 mol) of a polyether of trimethylol propane, propylene oxide and ethylene oxide having an OH-number of 35 are dried by heating for 30 minutes to 120° C. in a vacuum of 12 Torr and subsequently reacted with 15.2 g (0.05 mol) of bis-(3-isocyanato-4-methylphenyl)-carbodiimide.

After the isocyanate groups had reacted at from 110° to 120° C., 3.6 g (0.05 mol) of acrylic acid are added at from 80° to 90° C. The polyhydroxy polyether formed, which is modified with acryloyl urea groups, has a viscosity $\eta_{24}$ of 8520 cP and an OH-number of 24 (molecular weight approximately 10,000) after thin-layer distillation at from 90° to 100° C./0.15 Torr.

EXAMPLE 5

2400 g (0.5 mol) of a polyether of trimethylol propane, propylene oxide and ethylene oxide having an OH-number of 35 are dehydrated by heating to 120° C. in a vacuum of 12 Torr and subsequently combined, at 120° C., with 76 g (0.25 mol) of bis-(3-isocyanato-4-methylphenyl)-carbodiimide. After all the isocyanate groups have reacted, which takes about 2 hours, 21.5 g (0.25 mol) of methacrylic acid are added. The product which contains methacryloyl urea groups has a viscosity at 24° C. of 13320 cP and an OH-number of 23 (molecular weight approximately 10,000).

EXAMPLE 6

200 g (0.1 mol) of a polypropylene glycol having an OH-number of 56 are dehydrated for 30 minutes at 120° C. in a vacuum of 12 Torr. 15.2 g (0.05 mol) of bis-(3-isocyanato-4-methylphenyl)-carbodiimide are then added at from 110° to 120° C.

After the isocyanate groups have reacted, 5.05 g (0.025 mol) of sebacic acid are stirred in at from 80° to 90° C. The polyhydroxy polyether modified with acyl urea groups has a viscosity $\eta_{24}$ of 34400 cP (molecular weight approximately 9000).

EXAMPLE 7

480 g (0.1 mol) of a polyether of trimethylol propane, propylene oxide and ethylene oxide having an OH-number of 35 are dehydrated for 30 minutes at 120° C./12 Torr and subsequently reacted with 15.2 g (0.05 mol) of bis-(3-isocyanato-4-methylphenyl)-carbodiimide.

After the isocyanate groups have reacted at from 110° to 120° C., 1.5 g (0.025 mol) of acetic acid are stirred in at from 80° to 90° C. Thereafter, the product still shows a strong carbodiimide band in its IR-spectrum. The remaining carbodiimide bands are converted into guanidine groups by introducing 1.1 g (0.025 mol) of dimethylamine. The pale reddish product formed has a viscosity $\eta_{24}$ of 7400 cP (molecular weight approximately 10,000).

EXAMPLE 8

100 g (0.4 mol) of 4,4'-diisocyanatodiphenyl methane dissolved in 100 g of xylene are subjected to carbodiimide formation at 120° C. in the presence of 8 g of the insoluble catalyst containing phosphine oxide groups according to Example 1a of DOS No. 2,552,350 until 3.5 liters of carbon dioxide have formed. The catalyst is separated off by filtration and 70 g (0.2 equivalents of isocyanate groups, as determined by titration) of the filtrate are reacted with 400 g (0.2 mol) of a polypropylene glycol having an OH-number of 56 which was dried by heating to 120° C./12 Torr.

After the isocyanate groups have reacted at from 110° to 120° C., the reaction mixture is cooled to from 80° to 90° C. and 3.2 g (0.055 mol) of acetic acid are added. Following removal of the solvent, the polyhydroxy polyether formed, which is modified with acyl urea groups, has a viscosity $\eta_{24}$ of 8730 cP and an OH-number of 28 (molecular weight approximately 4600).

EXAMPLE 9

200 g (0.1 mol) of a polypropylene glycol having an OH-number of 56 are dehydrated at 120° C. in a vacuum of 12 Torr and reacted with 15.2 g (0.05 mol) of bis-(3-isocyanato-4-methylphenyl)-carbodiimide.

After the isocyanate groups have reacted at from 110° to 120° C., 10.1 g (0.05 mol) of sebacic acid are stirred in at from 80° to 90° C. The polyhydroxy polyether which is modified both with acyl urea groups and also with carboxyl groups has a viscosity $\eta_{24}$ of 39800 cP and an acid number of 15.

EXAMPLE 10

111 g (0.5 mol) of 1-isocyanato-3,3,5-trimethyl-5-isocyanatomethyl cyclohexane are subjected to carbodiimide formation at 150° C. in the presence of 0.3 ml of a mixture of 1-methyl-1-phospha-2-cyclopentene-1-oxide and 1-methyl-1-phospha-3-cyclopentene-1-oxide until 6 liters of carbon dioxide have formed.

20 g. (0.05 mol) of the reaction product are reacted with 200 g (0.1 mol) of a polypropylene glycol having an OH-number of 56 which has dried by heating to 120° C. in a vacuum of 12 Torr.

After the isocyanate groups have reacted at from 110° to 120° C., the reaction mixture is cooled to from 80° to 90° C. and 8 g (0.05 mol) of N,N-dimethyl-6-aminocaproic acid are added. The polyhydroxy polyether formed, which is modified with acyl urea groups, has a viscosity $\eta_{24}$ of 10700 and an OH-number of 26 (molecular weight approximately 4600).

EXAMPLE 11

15.2 g (0.2 mol) of 1,2-propane diol dissolved in 60 ml of N,N-dimethyl formamide are reacted at 80° C. with 30.4 g (0.1 mol) of bis-(3-isocyanato-4-methylphenyl)-carbodiimide dissolved in 250 ml of toluene.

After the isocyanate groups have reacted, 6.6 g (0.11 mol) of acetic acid are added at from 80° to 90° C. and the solvent is subsequently removed. A product containing acetyloyl groups and having a melting point of 85° C. is obtained.

EXAMPLE 12

172 g (0.1 mol) of a polyester of adipic acid, 1,6-hexane diol and neopentyl glycol having an OH-number of 66 are dried by heating to 120° C. in a vacuum of 12 Torr and subsequently mixed with 15.2 g (0.05 mol) of bis-(3-isocyanato-4-methylphenyl)-carbodiimide. After the isocyanate groups have reacted at from 110° to 120° C., 3.3 g of acetic acid are added at 80° C. A wax-like polyol containing acetyloyl groups is obtained (molecular weight approximately 3800).

EXAMPLE 13

200 g (0.1 mol) of a polyether of propylene glycol and propylene oxide having an OH-number of 56 are dehydrated by heating to 120° C. in a vacuum of 12 Torr and subsequently reacted at 120° C., with 15.2 g (0.05 mol) of bis-(3-isocyanato-4-methylphenyl)-carbodiimide. After all the isocyanate groups have reacted, which takes about 2 hours, 3.8 g (0.05 mol) of thioacetic acid are added at 120° C. The polyol formed, which is modified with acetyloyl thiourea groups, has a viscosity $\eta_{24}$ of 2050 cP (molecular weight approximately 4400).

What is claimed is:

1. Compounds containing at least two terminal hydroxyl groups and having a molecular weight of from 400 to 20,000 which compounds comprise segments in their molecular structure corresponding to the following general formulae:

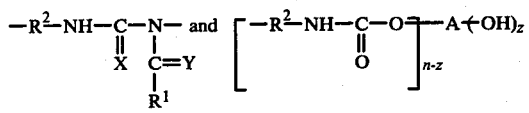

wherein
X and Y, which may be the same or different, each represents oxygen or sulphur;
$R^1$ represents hydrogen or a monofunctional or—in the form of a bridge to further acyl groups—a di- or trifunctional $C_1$–$C_{18}$ aliphatic, $C_4$–$C_{15}$ cycloaliphatic, $C_6$–$C_{15}$ araliphatic or aromatic radical which may contain one or two double bonds and/or be branched and which may optionally contain one or two substituents selected from the group consisting of hydroxyl, mercapto, secondary amino, sulphonic acid ester, phosphonic acid ester, carboxylic ester, siloxane or trifluoromethyl groups, fluorine, chlorine, bromine or iodine;
$R^2$ represents a difunctional aliphatic, cycloaliphatic, aromatic or araliphatic radical containing from 4 to 25 carbon atoms obtained by removing the isocyanate groups from a diisocyanate;
A represents an n-functional radical obtained by removing the hydroxyl groups from a polyhydroxyl compound having a molecular weight of from 62 to 6000;
n represents an integer of from 2 to 8; and
z represents an integer having a value of from 0 to (n−1).

2. The compounds of claim 1 wherein
X and Y are oxygen
$R^1$ represents $C_1$–$C_{17}$ aliphatic hydrocarbon radical which may optionally contain double bonds and/or branches and which may be substituted by chlorine, hydroxyl groups or secondary alkylamino groups; and
n is an integer from 2 to 4.

3. The compounds of claim 1 wherein the diisocyanate from which the NCO group is removed to form $R^2$ is of the type in which one isocyanate group has a greater tendency toward carbodiimide formation than the other.

4. The compounds of claim 1 wherein the polyol from which the hydroxyl group is removed to form A is selected from the group consisting of polypropylene glycols; trimethylol propane—or glycerol—started copolymers of propylene oxide and ethylene oxide; and polyesters based on adipic acid and 1,4-butane diol, diethylene glycol, 1,6-hexane diol and/or neopentyl glycol.

5. The compounds of claim 1 wherein $R^1$ represents a $C_1$–$C_{17}$ aliphatic hydrocarbon radical which may optionally contain one or two double bonds and/or be branched and which may be substituted by chlorine, hydroxy groups or secondary alkylamino groups.

6. A process for preparing polyhydroxyl compounds containing acyl urea groups and having a molecular weight of from 400 to 20,000, comprising (A) reacting diisocyanatocarbodiimides corresponding to the following general formula:

$$OCN-(R^2-N=C=N)_m-R^2-NCO$$

at a temperature of from about 25° to 130° C., optionally in the presence of an inert solvent, with polyhydroxyl compounds corresponding to the following general formula:

$$A-(OH)_n$$

in an OH/NCO-ratio of from 1.2:1 to 30:1 to form a polyhydroxyl compound containing carbodiimide groups and (B) completely or partially reacting the carbodiimide groups remaining in the product of Step (A) at a temperature of from 25° to 100° C., optionally in the presence of an inert solvent, with a carboxylic acid corresponding to the following general formula:

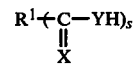

to form acyl urea groups, and (C) distilling off the inert solvent, if used, wherein
m represents a number of from 1 to 10;
s represents an integer of from 1 to 3; and
$R^1$, $R^2$, A, X, Y and n are as defined in claim 1.

7. The process of claim 6 wherein Step (A) is carried out at a temperature of from 90° to 120° C. and Step (B) at 60° to 90° C.

8. The process of claim 6 wherein m represents 1 or 2 and s represents 1 or 2.

9. The process of claim 6 wherein the OH/NCO ratio in Step (A) is from 1.5:1 to 15:1.

10. The product of the process of claim 6.

* * * * *